(12) United States Patent
Chen et al.

(10) Patent No.: US 8,721,441 B1
(45) Date of Patent: May 13, 2014

(54) COMPETITIVE MUSIC VIDEO GAME WITH INSTRUMENT SIMULATION

(75) Inventors: Travis Andrew Chen, Woodland Hills, CA (US); Alan Luis Flores, Woodland Hills, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 1624 days.

(21) Appl. No.: 12/014,723

(22) Filed: Jan. 15, 2008

(51) Int. Cl.
*A63F 9/00* (2006.01)

(52) U.S. Cl.
USPC .......................................................... 463/35

(58) Field of Classification Search
USPC .......................................................... 463/35
See application file for complete search history.

(56) References Cited

U.S. PATENT DOCUMENTS

| | | | | |
|---|---|---|---|---|
| 6,225,547 | B1* | 5/2001 | Toyama et al. | 84/611 |
| 6,354,939 | B1* | 3/2002 | Morita et al. | 463/1 |
| 6,827,645 | B2* | 12/2004 | Morita et al. | 463/9 |
| 7,320,643 | B1* | 1/2008 | Brosius et al. | 463/37 |
| 7,625,284 | B2* | 12/2009 | Kay et al. | 463/31 |
| 7,758,427 | B2* | 7/2010 | Egozy | 463/42 |
| 7,846,022 | B2* | 12/2010 | Chiwata | 463/35 |
| 2002/0094854 | A1* | 7/2002 | Morita et al. | 463/9 |
| 2002/0160825 | A1* | 10/2002 | Nicastro et al. | 463/16 |
| 2008/0070653 | A1* | 3/2008 | Sonn | 463/1 |
| 2008/0188277 | A1* | 8/2008 | Ritter et al. | 463/9 |

* cited by examiner

*Primary Examiner* — Seng H Lim
(74) *Attorney, Agent, or Firm* — Klein, O'Neill & Singh, LLP (57) ABSTRACT

A competitive music related video game including game play interaction between game players.

23 Claims, 6 Drawing Sheets

COMPETITIVE MUSIC VIDEO GAME WITH INSTRUMENT SIMULATION

BACKGROUND OF THE INVENTION

The present invention relates generally to music related video games, and more particularly to multiplayer music video games.

Video games provide hours of enjoyment for many, allowing users to enjoy graphical interactive displays, engage in competitions and take part in scenario-like activities. Often, through use of a controller common to multiple video games, users are able to take part in simulated activities that are normally unavailable to the user or which require specialized skills with which the user may not be adept.

Many video games provide for multiplayer game play, usually with users competing against one another. Competition between users, along with interaction between the competing users, may provide for increased enjoyment of game play, and may form an integral part of a video game experience.

Music related video games have become increasingly popular. Such games allow users to play along with a song, which may be a well-known song the user might enjoy even outside the context of a video game. Music related video games may provide interesting graphics to accompany audio of a song, and provide point scores indicating user proficiency in playing along with a song. Music related video games, however, may not be appropriate for competitive game play, playing of a song by multiple users may be more of a collaborative than competitive event. In addition, common play of a song may not provide sufficient interaction between users as each user may be effectively playing separately, without play of one user affecting play of another.

SUMMARY OF THE INVENTION

The invention provides a competitive multiplayer music related game and features of such a game. In one aspect the invention provides a method, performed by a processor, of providing a music related video game, comprising: providing music related game play by commanding display of user instruction information for play of portions of a song for a first user and commanding display of user instruction information for play of portions of a song for a second user, determining if input device status from a first controller simulating a musical instrument indicates compliance by the first user with the user instruction information for play of the portion of the song displayed for the first user and determining if the input device status from a second controller also simulating a musical instrument indicates compliance by the second user with the user instruction information for play of the portion of the song for the second user; receiving a request from the first controller to modify at least one of user instruction information for play of a further portion of the song for the second user, display of user instruction information for play of the further portion of the song for the second user, or effective operation of the second controller; and modifying music related game play in accordance with the request.

In another aspect the invention provides a method, performed by a video game console coupled to controllers in the shape of musical instruments providing simulated musical instrument operation and a display for presenting graphical information to users of the controllers, of providing for play of a competitive music related video game with interaction between players of the competitive music related video game, comprising: providing graphical symbols following similar paths to instruct users to operate a controller for each respective user so as to simulate play of portions of a song; determining whether controller operation for each user matches instructions for controller operation provided by the graphical symbols; awarding an attack opportunity to a user whose controller operation matches predefined instructions of the instructions for controller operation provided by the graphical symbols, the attack opportunity providing the user the opportunity to disrupt ease of simulated play of portions of the song of another user; and disrupting ease of simulated play of portions of the song of the other user responsive to a request for an attack by the user, the disruption increasing difficulty of controller operation of the other user matching instructions for controller operation provided by the graphical symbols.

These and other aspects of the invention are more fully comprehended upon review of this disclosure.

DETAILED DESCRIPTION

Figure 1:
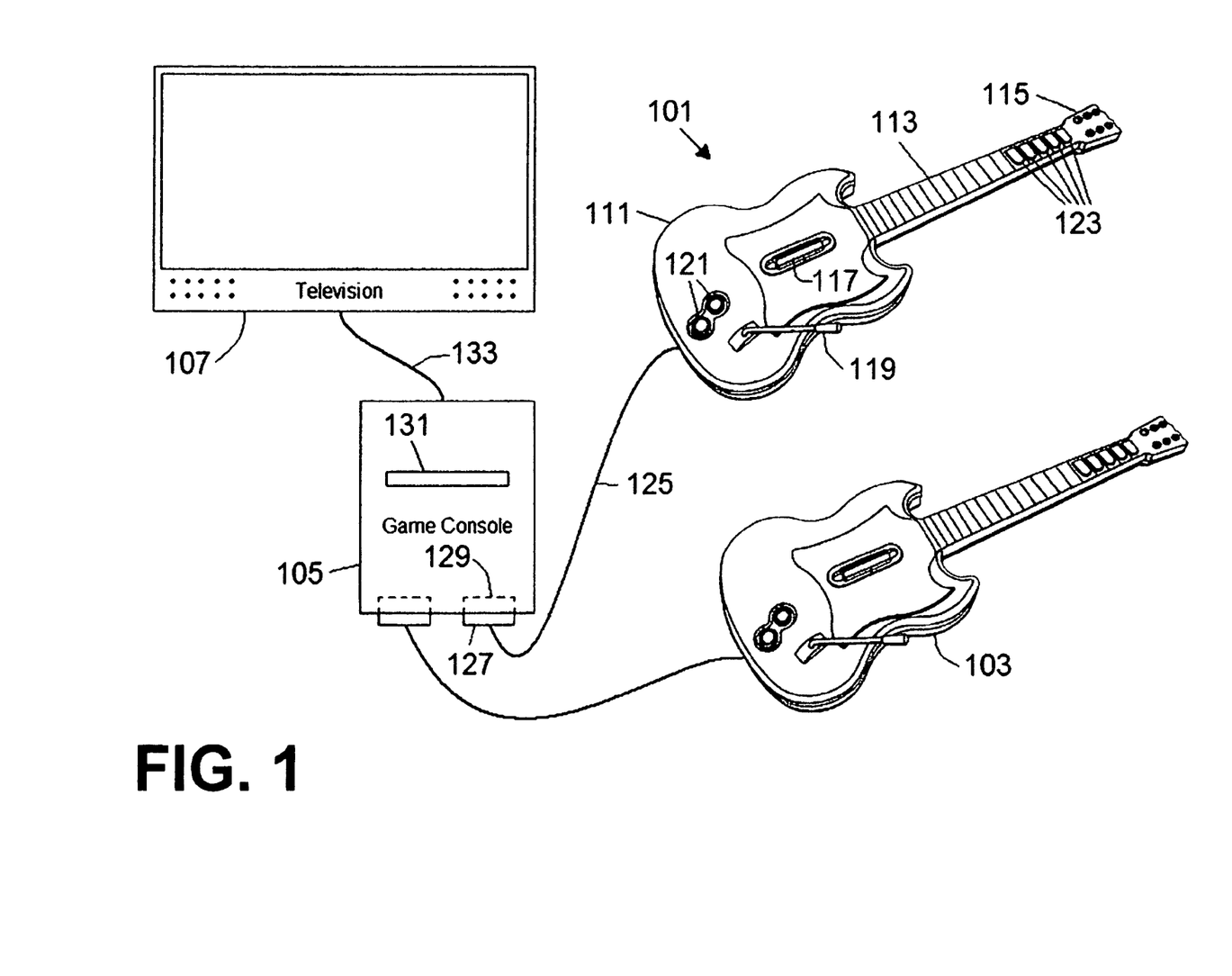
FIG. 1 illustrates a multiplayer music game system in accordance with aspects of the invention.

FIG. 1 illustrates an embodiment of a multiplayer music game system. The system includes a first video game controller 101 and a second video game controller 103. The video game controllers allow for simulation of a musical instrument, and as illustrated the video game controllers are in the shape of a guitar. In various embodiments, however, the video game controllers are in the shape of other musical instruments and allow for simulation of musical instruments other than for example guitars.

The game controllers are coupled to a video game console 105. The video game console provides display information and audio information to a monitor 107 including audio capability, although in some embodiments separate audio speakers may be used. It should also be recognized that in various embodiments devices other than video game consoles may be used, with for example some various embodiments using a general purpose computer such as a personal computer, a handheld device, or other device with game processing capabilities.

The video game console is configured to execute a music related game, such as one in which player instruction information is presented on the monitor and players, for example operating the controllers, are provided an audio presentation and evaluated based on the extent of compliance with the player instruction information. In various embodiments the music related game may be a single player music related game played by a single player using a controller, a multiple player music related game in which multiple players each using a controller play the game in a collaborative or competitive fashion, or a multiple player game in which at least one player uses a controller and at least one player is a simulated player. In some embodiments controllers and/or consoles associated with some or all of multiple players are coupled by way of a network, for example the Internet.

As is more fully discussed later, in some embodiments the music related game allows a player, or multiple players, to compete against or collaborate with another player or players, some or all of which may be simulated players and who may be depicted on the display. The player, or the multiple players, depending on the embodiment, may be able to modify player instruction information or musical instrument simulation relating to the other players, including simulated players. Thus, in some embodiments the music related game allows a first player, using for example a first controller, to modify player instruction information or musical instrument simulation relating to another player or players, who may be using other controllers or who may be simulated players.

As shown in FIG. 1, the first video game controller is a guitar shaped housing. The guitar shaped housing includes a body 111 and a neck 113 extending from the body, with the neck culminating in a head 115. A strum bar 117 is provided on the body and a plurality of fret buttons 123 are provided on the neck. In addition, a tremolo bar 119 extends from the body, and additional control buttons 121 are also provided on the body. Thus, a player may simulate play of a guitar with pressing of the fret buttons somewhat simulating action of fingering of guitar strings, strumming of the strum bar simulating strumming of guitar strings, and use of the tremolo bar allowing for simulated note bends or other features. In various embodiments, however, video game controllers having a shape and general configuration of other musical instruments or devices may be used.

The strum bar, the fret buttons, and the tremolo bar are coupled to circuitry within the guitar shaped controller, with the circuitry providing input signals for provision to the video game console. The first video game controller therefore generates and provides signals to the video game console in response to detection of a player's interaction with the fret buttons 123, the strum interface 117, the tremolo arm 119, and the control buttons 121. As shown, the signals are provided over a cord 125 of the first video game controller, with the cord terminating at a console connector 127 removably coupled with a controller port 129 on the video game console. In other embodiments, the first video game controller may communicate with and transmit signals to the video game console via a wireless connection.

As shown in FIG. 1, the second video game controller 103 has a configuration similar to and generally the same as the first video game controller 101, although in various embodiments the first and second video game controller may have different configurations, for example simulating different musical instruments. The second video game controller may therefore be used for standalone game play when connected to the video game console 105 by itself, or may be used simultaneously with the first video game controller. In some multiplayer game play, the first video game controller and the second video game controller preferably play the same game simultaneously, with players using the video game controllers competing or collaborating with each other in real time.

The video game console 105 includes a memory port interface 131, configured to communicate with an external memory source, for example a video game CD-ROM. During game play, the video game console reads and processes information stored in the external memory source in the memory port in the video game console. The information on the external memory source may include, for example, an interactive music game. The processor of the video game console processes the information from the external memory source, processes the signals from video game controllers, for example video game controllers 101 and 103 (and other video game controllers if applicable), and generates display data and audio data using the video game information from the external memory source, video game controller signals, and possibly signals received over a network. The video game console, in turn, sends display data and audio date to a television 107, or other display unit with audio capabilities, through an audio/video connection 133 from the video game console.

Figure 2:
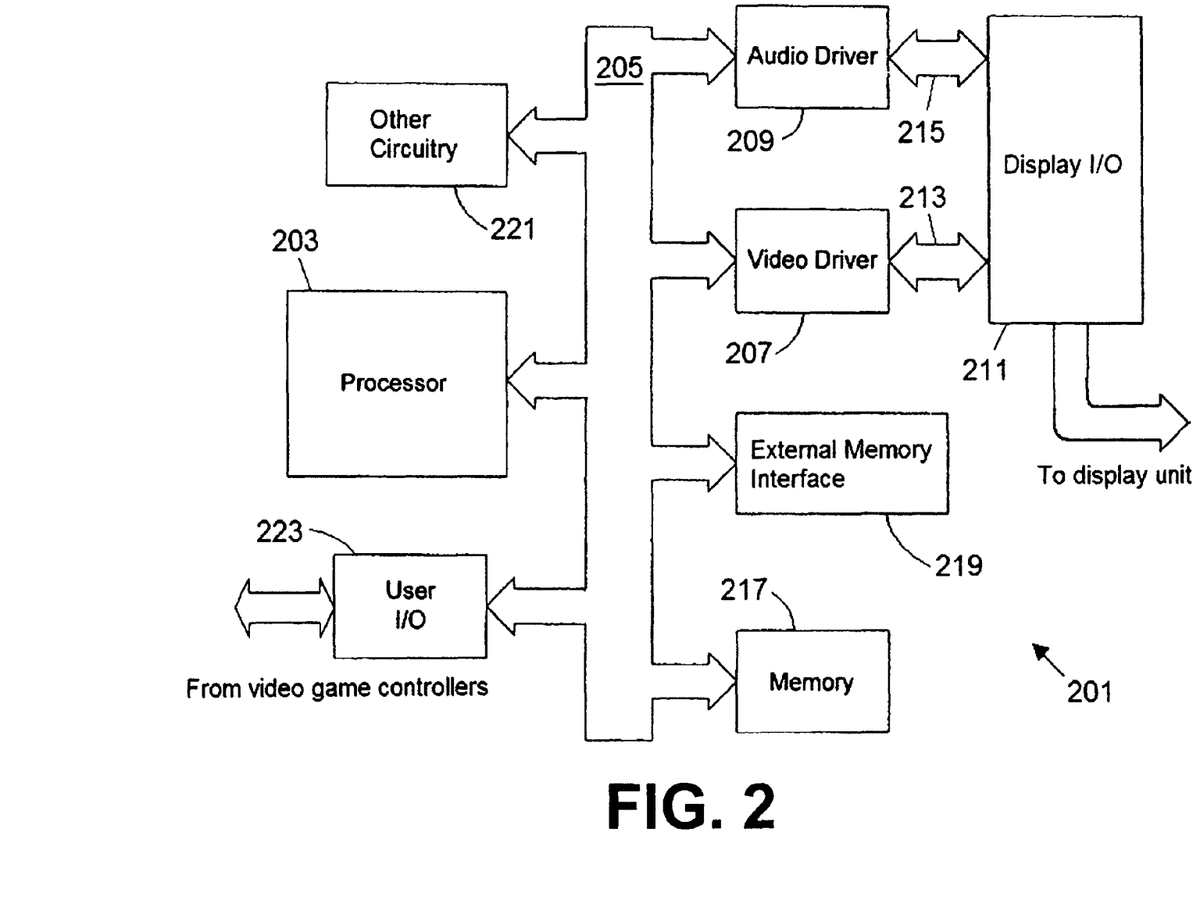
FIG. 2 is a partial block diagram of a game console in accordance with aspects of the invention.

FIG. 2 is an example of a block diagram of a processing unit 201 in a video game console in accordance with aspects of the invention. The processing unit includes a bus 205 coupled to a processor 203, a video driver 207, an audio driver 209, a display input/output port 211, memory 217, external memory interface circuitry 219, a controller input/output port 223, and other circuitry 221. In some embodiments, the processor is actually multiple processors, which may have separate data buses.

The processor 203, as illustrated in FIG. 2, is configured to communicate with each component coupled to the bus 205, and to execute the video game instructions. The processor sends video information pertaining to the video game to the video driver 207, and audio information pertaining to the video game to the audio driver 209. The video driver provides display information over a bus 213 to a display input/output port 211. The audio driver provides audio information over a bus 215 to the same display input/output port. Although the buses coupling the video driver and audio driver to the display input/output port are shown as bidirectional buses, in many instances the buses will be single directional output buses, and the display interface may only serve as an output port. Information from this display output port is provided to the display unit for video and audio generation.

The processing unit 201 is in data communication with video game controllers and a display unit. The game controllers provide inputs to the processing unit, and the display displays video game action based on signals provided to the display unit by the processing unit. In one embodiment, the game controllers may be guitar-shaped controllers adapted for use with the video game console, and the display unit may be a television.

Figure 3:
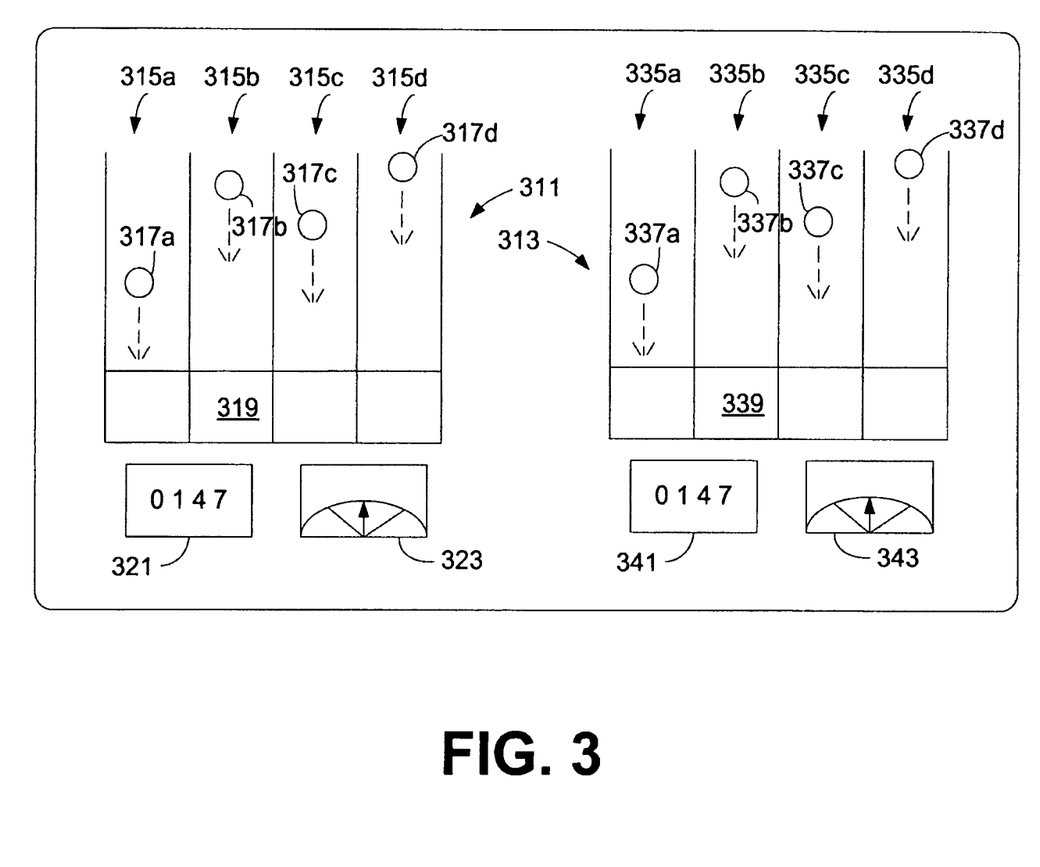
FIG. 3 is a screen shot of a display of a multiplayer music game in accordance with aspects of the invention.

FIG. 3 shows a sample screen shot for an example multiple player music game. The music game, for example, is provided using the system of FIG. 1. In the example music game, graphical symbols move across the display, such as the monitor of FIG. 1, usually with accompanying audio presentation of a song or portions of a song also being provided. The graphical symbols provide player instruction information. For example, players operating input devices are expected to operate the input devices, such as the guitar shaped controllers of FIG. 1, based on displayed position of the graphical symbols. In most embodiments of the music game, each player is rewarded for compliance with the user instruction information with game points and also further audio presentation of the song or portions of the song, or possibly non-song audio indicating the player did not comply with the player instruction information, allowing each player to "play" the song or portions of the song.

The sample screen shot of FIG. 3 includes a first portion 311 relating to a first player and a second portion 313 relating to a second player. In some embodiments, however, additional portions may be displayed for further players, or only a single portion may be displayed. In various embodiments the first player and second player may be operating video game controllers, the first player may be operating a video game controller while the second player is a simulated player, players may be various combinations of players operating video game controllers and simulated players. Each of the first and second portions show four graphical symbols 317a-d and 337a-d, respectively. The graphical symbols move across the display in, for each player, adjacent columnar paths 315a-d, 335a-d. In various embodiments different numbers of graphical symbols, different numbers of paths, or different types of paths may be used, with the paths themselves possibly changing over time. In addition, as the graphical symbols provide user instruction information, in various embodiments the player instruction information may be presented in other ways using the display, or in some embodiments the player instruction information may be presented using audio information provided by the handheld device.

In the example music game of FIG. 3, as each graphical symbol reaches a predefined area of the display, such as the area indicated by action zone 319 or action zone 339, the player may be expected to perform a particular action, for example using the controller. For example, for a guitar like controller such as discussed with respect to FIG. 1, the player may be expected to strum the strum bar while having a particular fret button depressed, or merely be expected to depress or have depressed the particular fret button. In many embodiments of the musical game, paths of the graphical symbols are arranged in a manner corresponding to arrangement of input devices on controllers simulating musical instruments, for example fret buttons of a guitar like controller or for further example drum positions of drums in a drum set. In other embodiments, particular shapes or colors may be associated with particular controller input devices, and particular paths or graphical symbols may be displayed in a shape or similar color similar or corresponding to the shapes or colors for the controller input devices. In such embodiments graphical symbols in a particular path or of a particular shape or color may correspond to player instructions to operate the corresponding particular input device.

In some embodiments of the music game of FIG. 3 player compliance with player instruction information is, in addition to audio song presentation, rewarded by accumulation of player points. Accordingly, the display includes a first player point score 321 and a second player point score 341. As illustrated, the players have the same score, and are therefore tied, although in many instances the players will have different point scores at different times during game play. In addition, the display includes a power level 321, 341 for each player, with the power level generally varying during game play based recent player compliance with player instruction information.

In some embodiments of the music related game, a player may play against a simulated player. For example, the player may play against a simulated player forming a representation of an artist well known for musical ability. Preferably, the music related game provides the opportunity for the first player to play a song or portions of a song which has an association with the artist, with the association generally derived from the song being one performed by the artist. Preferably the first player may compete against the simulated player in play of multiple songs of the artist, which may be arranged in a series. In some embodiments some of the songs, such as later songs in the series of songs, are available for play only if the first player is able to outplay the simulated player, for example as determined by point score or by causing the simulated player's power level to drop below a predefined level.

In some embodiments of a multiple player music game each player may modify the player instruction information provided to another player or modify operation of the simulated musical instrument, provided by the controller, of another player. Such modifications may be considered an attack on the other player, with command of the attack sometimes considered a launch or throw of an attack, which may be simply referred to as an attack or a launch or a throw.

Figure 4:
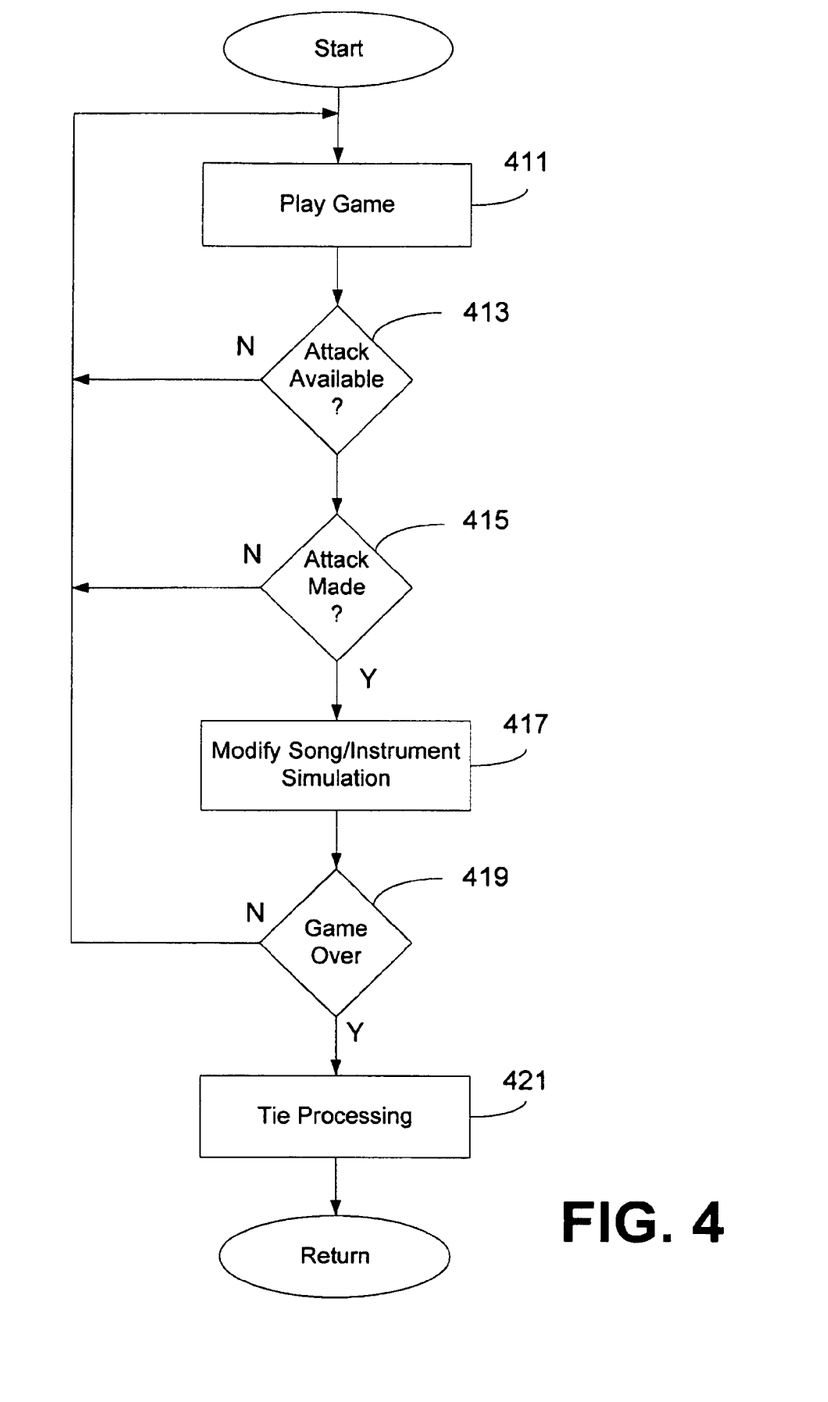
FIG. 4 is a flow diagram of a process of performing attacks in a multiplayer music game in accordance with aspects of the invention.

FIG. 4 is a flow diagram of a process for providing a multiple player competitive music game including attacks on other players. The process may be performed, for example, by a video game console such as discussed with respect to FIGS. 1 and 2, with a processor of the video game console executing program instructions stored in memory and commanding video presentations and audio presentations on for example a television. In block 411 the process provides music game functions, for example commanding presentation of player instruction information, determining player compliance with the user instruction information, determining audio presentations, point accumulation, and power levels based on such compliance, and commanding the audio presentation and display of accumulated points and power levels. For example in some embodiments the process provides player instruction information and other information on a display and otherwise provides for game play such as discussed with respect to FIG. 3.

In block 413 the process determines whether the player has an attack available. In most cases, players accumulate attacks during game play. In some embodiments an attack is available when a player has accumulated a predetermined number of points. In other embodiments an attack is available if a player has successfully complied with predetermined player instruction information. For example, a set of symbols providing player instruction information may represent a guitar riff and an attack is available if the player has successfully performed the riff. In other embodiments, an attack is available if a player has successfully complied with player instruction information presented as particular symbols, such as symbols of a particular size, shape, or color. In some embodiments attacks are queued when generated, for example in a first in, first out manner or a last in, first out manner. In such embodiments the process may determine if an attack is available by determining whether the queue is not empty. In addition, in some embodiments the process determines attack availability based on time of play or some other predefined criteria.

In block 415 the process determines whether a player has requested launch of an attack. In some embodiments the process automatically launches attacks for a player as soon as the attacks are available, for example the process assumes a player has requested launch of an attack if an attack is available, regardless of whether the player has made such a request. In some embodiments the process determines whether the player has requested launch of an attack by determining if an input from the controller, namely the simulated musical instrument, matches a predetermined value or predetermined sequence of values. The input may be generated by the simulated musical instrument in response to operation of player manipulable input devices of the simulated musical instrument, for example the fret button, strum bar, or tremolo bar of the simulated guitar of FIG. 1. Preferably, however, the simulated musical instrument provides at least one additional input representative of a state of the simulated musical instrument, for example its position. Accordingly, in some embodiments the simulated musical instrument includes a sensor providing position related information. The sensor may be a position sensor, an accelerometer, a magnetic sensor, or other sensor which has a varying output based on position, direction, or motion or change in motion. Thus, for example, in embodiments in which the simulated musical instrument is a guitar, an attack may be launched by a player rocking a head of the guitar back and then forward, as if using the guitar head to throw an object at an opponent, with an accelerometer in a housing of the simulated guitar generating a signal, and the process determining if the signal indicates appropriate movement of the simulated guitar.

In block 417 the process modifies some aspect of game play for the player who is the target of an attack, although in some embodiments the process may modify some aspect of game play of the player who launches the attack. In many embodiments an attack modifies another player's player instruction information, presentation of the other player's player instruction information or simulated operation of the other player's simulated musical instrument, for example as provided by a game controller in a shape of a musical instrument. For example when the simulated musical instrument is a guitar, a particular fret button, representing a string or strings of a guitar, may temporarily (or permanently), be simulated as broken, with the process not recognizing or rewarding depression of the particular fret button. Similarly, the process may simulate a malfunction of a tremolo bar or a strum bar of the controller, for example by not recognizing change in status of inputs based on position of the tremolo bar or the strum bar. In some embodiments the modification results in the apparent failure of particular buttons on the game controller for a period of time or until the player inputs a corrective command. In some embodiments the modification results in changes to the player instruction information. In some embodiments the modification results in changes to the display of player instruction information on a screen. For example, where the player instruction information is displayed as symbols that represent guitar strings and frets, the modification may reverse the order of the guitar strings, or the modification may otherwise modify the player instruction information by for example not displaying selected symbols of the player instruction information or changing the path followed by some of the symbols. In addition, in some embodiments the modification may remove or change displayed position of the action zone. In another example, the modification may result in a change to the player instruction information that increases the speed or difficulty of game play, for example by increasing the frequency of player instruction information.

In block 419 the process determines whether the end of the game has been reached. If the game has not reached the end the process returns to block 411 and continues game play. In some embodiments the end of the game is reached at conclusion of a song, conclusion of a predefined time period from the beginning of game play, or some other predefined criteria. In some embodiments the end of the game may instead or additionally being reached if one or more player's power levels has fallen below a predefined level, if one or more players have not complied with particular player instruction information, or upon occurrence of predefined events or conditions.

If the game has reached the end the process continues to block 421 and performs tie processing. In some embodiments no tie processing may be performed, but in some embodiments additional game play is provided if, at what would otherwise be end of game play, the players in the multiplayer game have a tie score. Accordingly, in some embodiments tie processing includes additional game play for a timed period, game play until a predefined number of points is reached, game play until a predefined point differential between players is reached, or until some other criteria is met.

Figure 5:
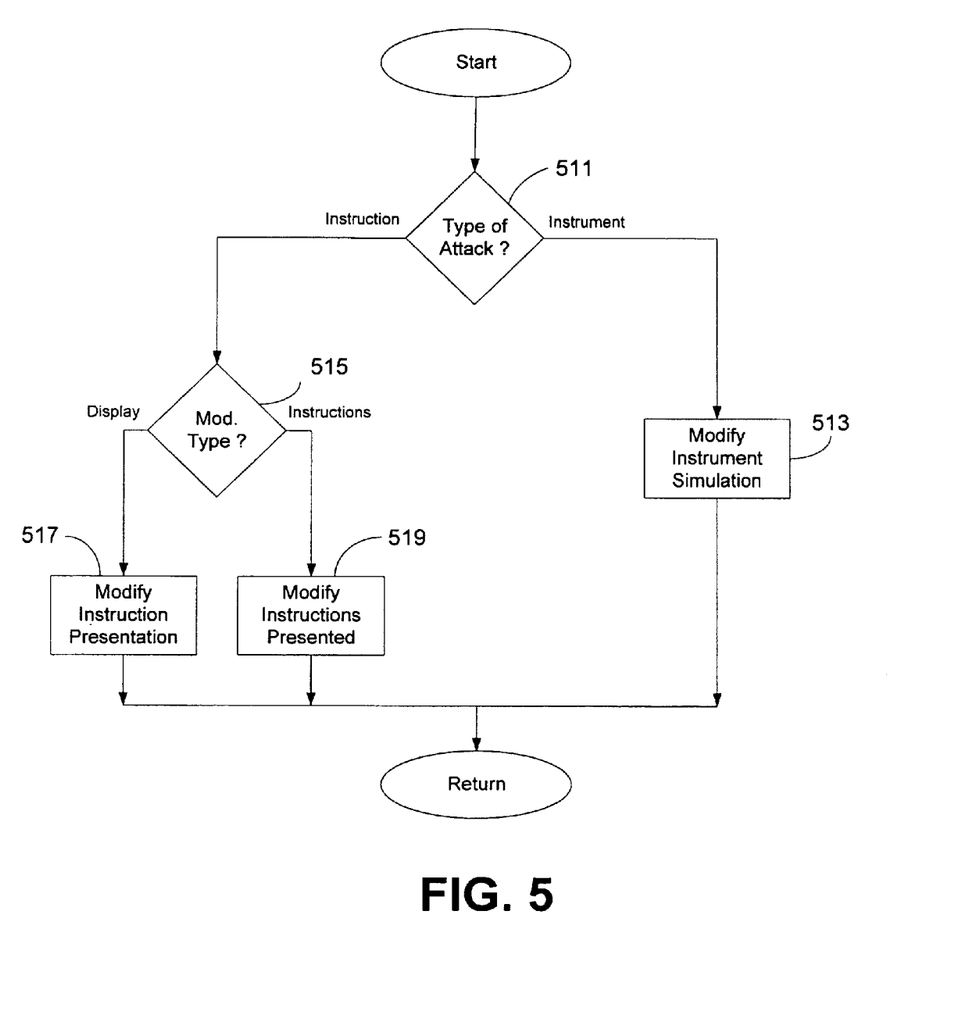
FIG. 5 is a flow diagram of a process of processing attacks in a multiplayer music game in accordance with aspects of the invention.

FIG. 5 is a flow diagram of an embodiment of a process of music game performance of attacks. The music game may be, for example, a music game such as described with respect to FIG. 3. In some embodiments the process of FIG. 5 is performed to implement block 417 of FIG. 4.

In block 511 the process determines a type of attack to be performed. In some embodiments the process determines the type of attack on the basis of a particular player input from a game controller provided as a simulated musical instrument. In some of these embodiments the process determines the type of attack on the basis of data received from sensors or buttons of the simulated musical instrument. In other embodiments the process determines the type of attack automatically based on attacks available to the player throwing or launching the attack.

The type of attack in some embodiments, and as shown in FIG. 5, is an attack that relates to operation of another player's simulated musical instrument or an attack that relates to the another player's player instruction information. In various embodiments, however, the type of attack may merely be considered any one of several attacks, such as those discussed herein. If the attack relates to operation of the other player's simulated musical instrument the process proceeds to block 513. If the attack relates to the opposing player's player instruction information the process proceeds to block 515.

In block 513 the process modifies simulated operation of the other player's simulated musical instrument. The modification performed may depend on which attack of a plurality of attacks was launched. For example, for a simulated guitar, in the event of a first predefined attack the process may simulate breaking of a guitar string by disabling or ignoring particular inputs indicative of depression of particular fret buttons of the simulated guitar. In the same or other embodiments, in the event of a second predefined attack the process may simulate improper tuning of the simulated guitar by remapping input processing of fret buttons.

The process thereafter returns, although it should be recognized that the process, or another process, may remove effects caused by the attack after a predefined time period, which may vary based on game parameters or game state, or after the other player takes a specified action or series of actions. For example, in some embodiments the process removes effects caused by the attack after the other player depresses a fret button of a controller a predefined number of times, operates a tremolo bar of a controller in a predefined manner, or performs a series of predefined actions utilizing the controller.

If the type of attack relates to the other player's player instruction information, in block 515 the process determines if the attack relates to display of the player instruction information or content of the player instruction information for the other player. If the attack relates to display of the player instruction information the process proceeds to block 517, otherwise the process proceeds to block 519.

In block 517 the process modifies presentation of player instruction information for the other player. In some embodiments the process alters the display of player instruction information. For example, one modification may cause variation in paths followed by graphical symbols providing player instruction information. The paths, which together may be called a fret highway for example in a guitar related music game, may move in unison over time, so as to appear to vibrate, twist, bend, rotate, or otherwise vary over time. In other embodiments the process may alter relative order or orientation of the paths, or modify display of the graphical symbols, or obscure, partially or wholly, all or part of the paths or graphical symbols. For example, one modification may cause the section of the display representing the strings and frets to be reversed.

In block 519 the process modifies the content of the player instruction information for the other player. For example, the player instruction information may be modified to provide instructions to perform increased numbers of operations with the simulated musical instrument. In embodiments in which graphical symbols of the player instruction information are meant to have some correspondence to musical notes, for example, the process may provide additional notes for play, possibly in combination, or possibly even too many notes, at least for play by a player of a particular skill level.

After either block 517 or block 519 the process returns. As with block 513, however, it should be recognized that the process, or another process, may remove effects caused by the attack after a predefined time period, which may vary based on game parameters or game state, or after the other player takes a specified action or series of actions.

Figure 6:
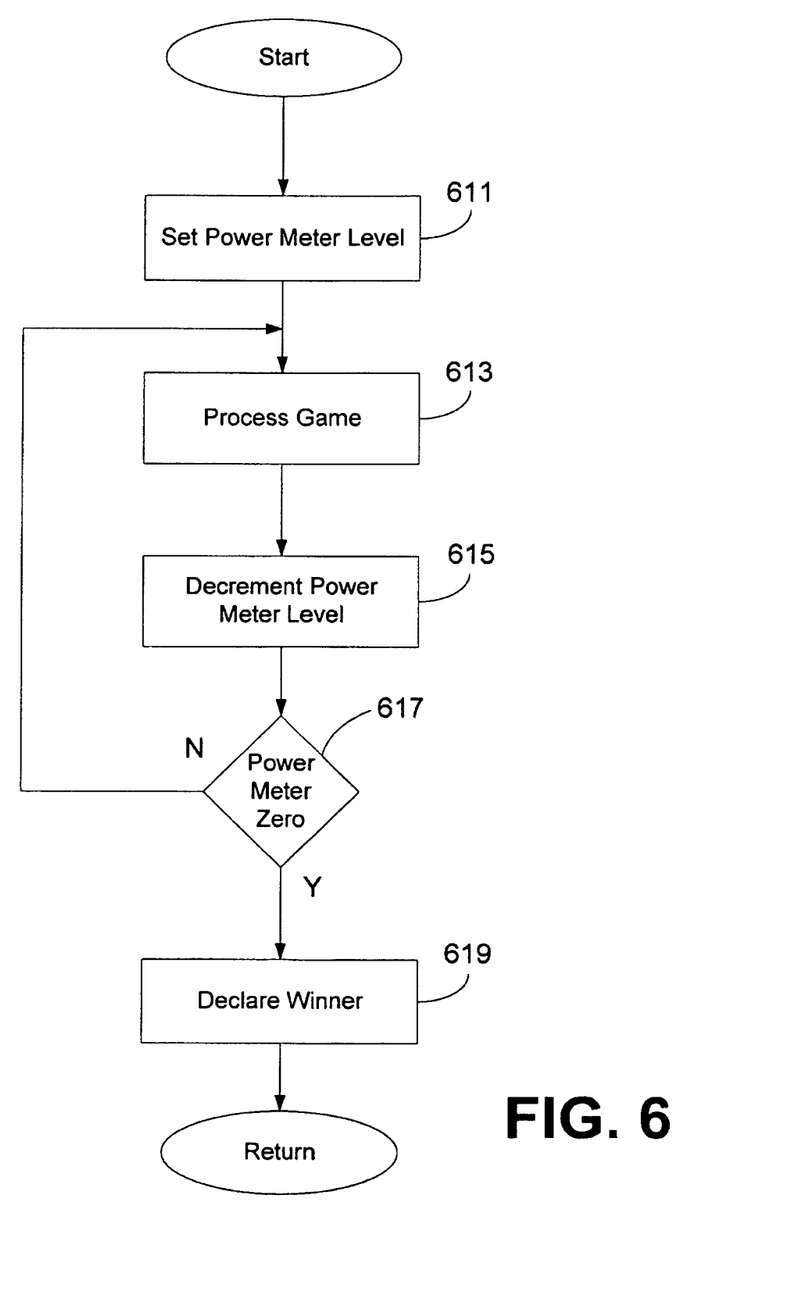
FIG. 6 is a flow diagram of a process for performing tie processing in a multiplayer music game in accordance with aspects of the invention.

FIG. 6 is a flow diagram of a process performing player tie processing. In block 611 the process determines a power level associated with each player, for example a power level as discussed with respect to FIG. 3. Also as indicated with respect to FIG. 3, power levels may be displayed as a graphical representation on a display of the game. In some embodiments the process determines the player power level on the basis of player attribute data. In other embodiments the process sets the power level on the basis of a predetermined value. For example, at the beginning of a tie-breaker battle the process may set the power level to the same value for all players. In many embodiments, however, the process sets, or retains, a power level associated with each player at the end of what may be considered normal game play.

In block 613 the process provides multiple player music game play, for example as described with respect to FIG. 3 and other figures.

In block 615 the process decrements a power levels of at least one player, and usually all players. In many embodiments power levels are decremented periodically during game processing. In some embodiments the process also modifies the graphical representation of the player's power level so as to show a reduced power level. In other embodiments the process modifies an attribute associated with the player's profile that represents the player's remaining power. In other embodiments the process modifies a field in the memory of the computer or video game console that is associated with a player's total accumulated points or remaining power.

In block 617 the process determines whether a player's power level is at or below a specified level, such as a zero level. If not, the process returns to block 613. If a player's power level when a player's power level is equal to zero, the process continues to block 619, declares the other player as the winner, for example through display of appropriate congratulatory graphics, and game play will end and the process returns.

Accordingly, the invention provides for competitive game play of a music related video game. Although the invention has been described with respect to certain embodiments, it should be recognized that the invention may be practiced other than as specifically described, the invention comprising the claims and their insubstantial variations supported by this disclosure.

What is claimed is:

1. A method, performed by a processor, of providing a music related video game, comprising:

providing music related game play including commanding display of player instruction information for play of portions of a song by a first player and commanding display of player instruction information for play of portions of a song for a second player, determining if input device status from a first controller simulating a musical instrument indicates compliance by the first player with the player instruction information for play of portions of the song by the first player and determining compliance by a second player with player instruction information for play of portions of the song by the second player;

receiving a request from the first controller to modify an aspect of game play by simulating a malfunction of the musical instrument simulated by the second controller; and modifying the game play in accordance with the request.

2. The method of claim 1 wherein the second player is a simulated player.

3. The method of claim 1 wherein determining compliance by the second player with player instruction information for play of portions of the song for the second player comprises determining if input device status from a second controller providing the simulated musical instrument for the second player indicates compliance by the second player with the player instruction information for the second player.

4. The method of claim 1 wherein the simulated malfunction is a broken string of a guitar, the second controller simulating the guitar, with input device status from the second controller including fret button status, fret button status simulating status of depression of guitar strings of the guitar.

5. The method of claim 1 wherein providing music related game play additionally comprises accumulating point scores for each of the first player and the second player based on compliance with respective player instruction information.

6. The method of claim 5 further comprising determining if the first player and the second player have the same point score at an end of game play.

7. The method of claim 6 wherein providing music related game play further comprises determining a power level for each of the first player and the second player based on compliance with respective player instruction information, and further comprising providing further music related game play if the first player and the second player have the same point score at the end of game play, providing further music related game play comprising providing music related game play and decrementing power level for each of the first player and the second player.

8. The method of claim 1 further comprising removing modification of music related game play in accordance with the request if input device status from the second controller indicates second player operation of the second controller matching a predefined operation.

9. The method of claim 8 wherein the predefined operation is a sequence of changes in input device status from the second controller.

10. A method, performed by a video game console coupled to at least one controller in the shape of a musical instrument providing simulated musical instrument operation and a display for presenting graphical information, of providing for play of a competitive music related video game with interaction between players of the competitive music related video game, comprising:

providing graphical symbols to instruct a first player to operate a controller so as to simulate play of portions of a song;

determining whether controller operation for the first player matches instructions for controller operation provided by the graphical symbols;

awarding an attack opportunity to the first player if controller operation by the first player matches predefined instructions of the instructions for controller operation provided by the graphical symbols, the attack opportunity providing the first player the opportunity to disrupt ease of simulated play of portions of the song by a second player by modifying an aspect of game play; and disrupting ease of simulated play of portions of the song by the second player by assuming controller input device status for at least some controller inputs of the controller of the second player regardless of actual status of those controller inputs in response to a request for an attack by the first player, the disruption increasing difficulty of simulated play of portions of the song by the second player.

11. The method of claim 10 wherein the second player is a simulated player.

12. The method of claim 10 further comprising providing graphical symbols to instruct the second player to operate a controller of the second player so as to simulate play of portions of the song.

13. The method of claim 12 wherein disrupting ease of simulated play of portions of the song by the second player comprises providing additional graphical symbols for the second player.

14. The method of claim 12 wherein disrupting ease of simulated play of portions of the song by the second player comprises changing paths followed by the graphical symbols.

15. The method of claim 10 wherein assuming controller input device status for at least some controller inputs of the controller of the second player regardless of actual status of those controller inputs comprises not recognizing depression of a particular fret button of a plurality of fret buttons of the controller of the second player.

16. The method of claim 10 wherein assuming controller input device status for at least some controller inputs of the controller of the second player regardless of actual status of those controller inputs comprises not recognizing change in status of an input based on position of a strum bar of the controller of the second player.

17. The method of claim 10 wherein assuming controller input device status for at least some controller inputs of the controller of the second player regardless of actual status of those controller inputs comprises not recognizing change in status of an input based on position of a tremolo bar of the controller of the second player.

18. The method of claim 12 wherein disrupting ease of simulated play of portions of the song by the second player comprises modifying display of an action zone for the second player.

19. The method of claim 12 further comprising determining point scores for each of the first player and the second player.

20. The method of claim 19 further comprising providing a tie-breaker if the first player and the second player have the same point score at an end of normal game play.

21. The method of claim 20 wherein the tie-breaker includes decrementing power levels associated with each of the first player and the second player on at least a timed basis.

22. The method of claim 12 further comprising ceasing disrupting ease of simulated play of portions of the song by the second player.

23. The method of claim 22 wherein cessation of disruption of ease of simulated play by the second player occurs in response to at least one predefined input sequence from the controller of the second player.

* * * * *